US007044091B2

(12) United States Patent
Hoche et al.

(10) Patent No.: US 7,044,091 B2
(45) Date of Patent: May 16, 2006

(54) CYLINDER FOR AN INTERNAL COMBUSTION ENGINE OF A MANUALLY GUIDED IMPLEMENT

(75) Inventors: Florian Hoche, Waiblingen (DE); Niels Kunert, Sindelfingen (DE); Horst Denner, Weinstadt (DE)

(73) Assignee: Andreas Stihl AG & Co KG, (DE)

( * ) Notice: Subject to any disclaimer, the term of this patent is extended or adjusted under 35 U.S.C. 154(b) by 0 days.

(21) Appl. No.: 11/011,709

(22) Filed: Dec. 14, 2004

(65) Prior Publication Data

US 2005/0139177 A1 Jun. 30, 2005

(30) Foreign Application Priority Data

Dec. 24, 2003 (DE) ................................ 103 61 293

(51) Int. Cl.
*F02F 1/22* (2006.01)
*B23P 11/00* (2006.01)

(52) U.S. Cl. ................................ 123/73 PP; 123/65 P; 123/193.2; 29/888.61

(58) Field of Classification Search .............. 123/65 R, 123/65 P, 73 R, 73 A, 73 C, 73 PP, 193.2, 123/193.4; 29/888.06, 888.061
See application file for complete search history.

(56) References Cited

U.S. PATENT DOCUMENTS

| | | | | | |
|---|---|---|---|---|---|
| 3,643,637 | A | * | 2/1972 | Strossner et al. | 123/193.2 |
| 4,161,163 | A | * | 7/1979 | Boyesen | 123/73 PP |
| 4,167,160 | A | * | 9/1979 | Matsushita et al. | 123/73 PP |
| 4,213,431 | A | * | 7/1980 | Onishi | 123/73 PP |
| 4,395,978 | A | * | 8/1983 | Boyesen | 123/73 PP |
| 4,682,571 | A | * | 7/1987 | Kaufman et al. | 123/73 A |
| 5,791,304 | A | * | 8/1998 | Taipale | 123/73 C |

FOREIGN PATENT DOCUMENTS

| | | |
|---|---|---|
| AT | 393 409 B | 10/1991 |

* cited by examiner

*Primary Examiner*—Willis R. Wolfe, Jr.
(74) *Attorney, Agent, or Firm*—Robert W Becker & Associates; Robert W Becker

(57) ABSTRACT

A cylinder for an internal combustion engine of a manually guided implement, and a method of producing such a cylinder, are provided. A cast cylinder body that peripherally delineates a cylinder chamber has formed therein at least one transfer channel that is open inwardly into the cylinder chamber and includes a central portion, extending approximately parallel to the cylinder axis, and a head portion that above the central portion faces in the direction of the cylinder chamber. A cylindrical sleeve covers the central portion of the transfer channel inwardly in the direction of the chamber. The sleeve extends in the direction of the cylinder axis beyond the central portion and ends below the head portion.

12 Claims, 3 Drawing Sheets

Fig. 5
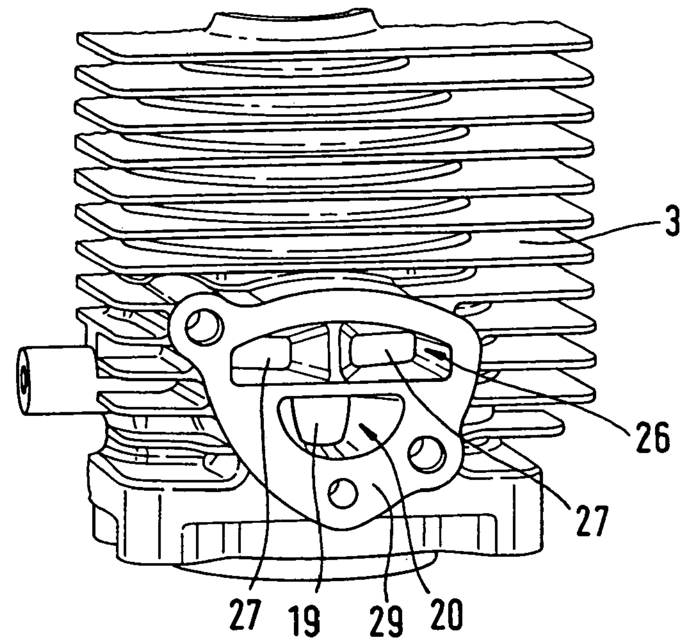
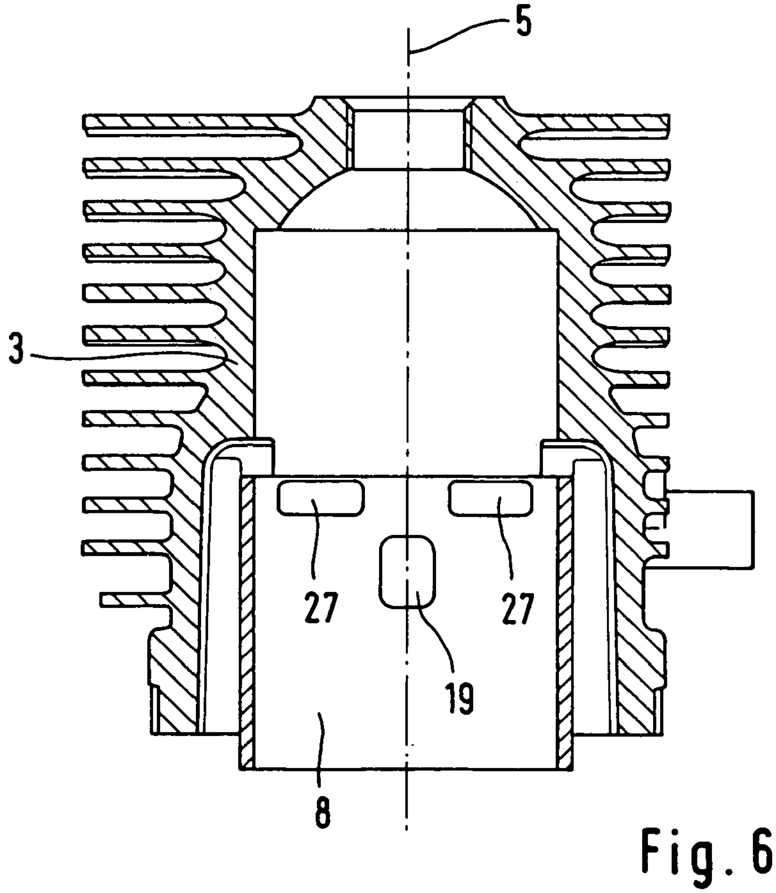
Fig. 6

CYLINDER FOR AN INTERNAL COMBUSTION ENGINE OF A MANUALLY GUIDED IMPLEMENT

BACKGROUND OF THE INVENTION

The present invention relates to a cylinder for an internal combustion engine of a manually guided implement, as well as a method for producing such a cylinder.

Manually guided implements, such as chain saws, brush cutters or the like, are equipped for the drive means with a small, single-cylinder internal combustion engine. To achieve an adequate drive capacity the internal combustion engine is operated at high speeds. When embodied as a two-cycle engine, a clean gas distribution is necessary in particular in the region of one or more transfer channels that are provided therefor. A suitable gas distribution is in this connection brought about in particular by a streamlined configuration of the transfer channel.

Relative to the piston displacement of the internal combustion engine, a high output is achieved at high speeds. The material stressing is correspondingly pronounced. An adequately sturdy internal combustion engine for receiving the thermal and mechanical output is, under the conditions of a mass production, to be produced with simple means. In particular, in this connection the manufacture of suitably formed transfer channels is to be taken into account.

Known from AT 393 409 B is a cast cylinder of a two-cycle engine, the cast cylinder body of which is provided with transfer channels that are open inwardly into a cylinder chamber. A second, similarly cast cylinder component is provided for being pressed into the cylinder body. The second cylinder component is provided on the outer side with projecting shaped parts that in the mounted state extend into the transfer channels and for the production of a suitable gas distribution form a curved, inwardly directed transfer channel. At its upper edge, the second cylinder component is provided with recesses that together with associated recesses of the cylinder body form a transfer window. In the mounted state, there results a butt joint between two components that extends approximately in the middle of the transfer window and is interrupted by the transfer window. After the pressing together of the two components, a common coating is provided on the inner side.

During the pressing of the second cylinder component into the cylinder body, a precise orientation of the position of the two parts relative to one another is necessary. Small errors in the angle in the circumferential direction lead to a non-alignment of the two components when forming the transfer channel. During the pressing-in, damage can occur to the two parts. A pressing-in at the wrong angle adversely affects the flow guidance of the fuel/air mixture in the transfer channels.

The cast component that is to be pressed in, as well as the cast cylinder body, are relatively brittle. To achieve the provided press fit, it is necessary to maintain low tolerances. High operating stresses and thermal deformations can adversely affect the press-fit connection. It is not possible to exclude damage to the coating in the region of the joint.

It is therefore an object of the present invention to improve the cylinder for the internal combustion engine of a manually guided implement such that a reliable operation is made possible under high operating loads with a simple manufacture.

It is a further object of the present invention to provide a simplified method for producing such a cylinder.

BRIEF DESCRIPTION OF THE DRAWINGS

These and other objects and advantages of the present invention will appear more clearly from the following specification in conjunction with the accompanying schematic drawings, in which:

FIG. 4 shows the cylinder body of FIG. 2 with the sleeve of FIG. 3 pressed in;

FIG. 5 is a perspective external view of the cylinder of FIG. 1 with an inlet channel; and FIG. 6 is an internal view of the cylinder of FIG. 5 with windows subsequently machined into the pressed-in sleeve.

SUMMARY OF THE INVENTION

Figure 1:
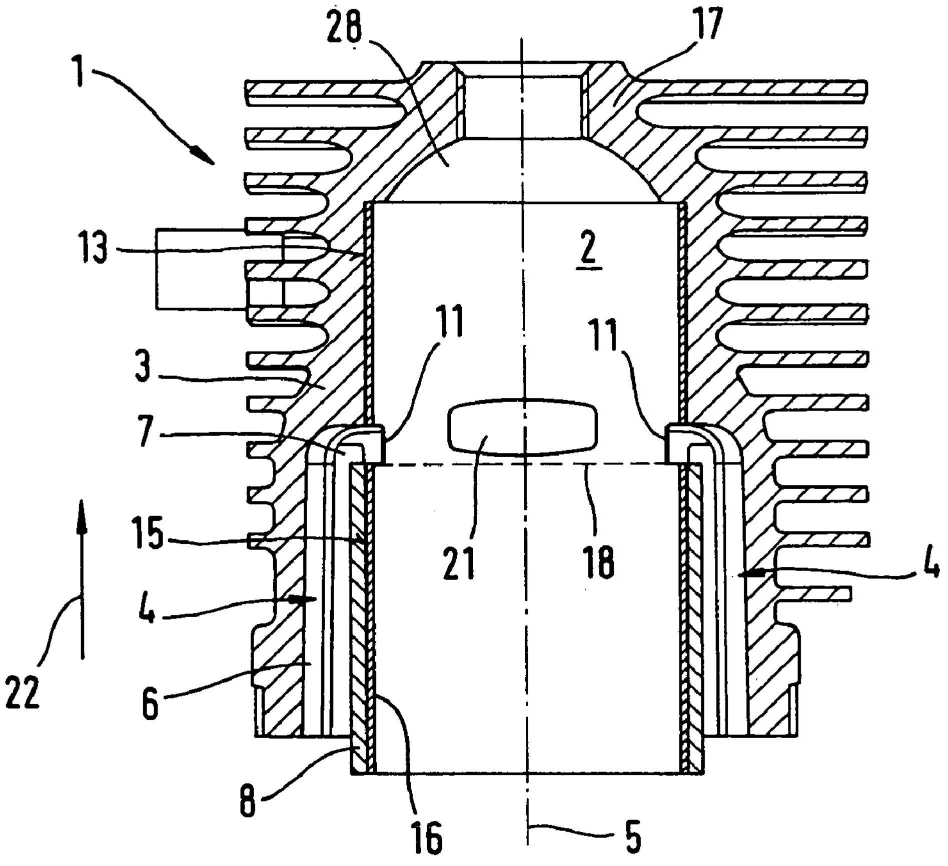
FIG. 1 is a longitudinal cross-sectional illustration of a finish-assembled cylinder having a schematically indicated bore coating.

The cylinder of the present invention comprises a cast cylinder body that peripherally delineates a cylinder chamber, whereby formed in the cylinder body is at least one transfer channel that is open inwardly into the cylinder chamber and includes a central portion, which extends approximately parallel to an axis of the cylinder, and a head portion that above the central portion faces in the direction of the cylinder chamber; a cylindrical sleeve covers the central portion of the transfer channel inwardly in the direction of the cylinder chamber, wherein the cylindrical sleeve extends in the direction of the cylinder axis beyond the central portion and ends below the head portion of the transfer channel.

The method of producing the cylinder of the present application includes the steps of first pressing the cylindrical sleeve into the cylinder body, subsequently machining the inner cylindrical surface of the cylinder body and the inner surface of the cylindrical sleeve to a common extent, and then providing both the cylindrical surface and the surface of the sleeve with a continuous coating that spans the butt joint.

A cylinder having a cast cylinder body is provided in which is formed at least one transfer channel that is open inwardly into the cylinder chamber, whereby the transfer channel includes a central portion, which extends approximately parallel to the cylinder axis, and a head portion that above the central portion faces in the direction of the cylinder chamber. In this connection, the central portion of the transfer channel is covered inwardly in the direction of the cylinder chamber by means of a cylindrical sleeve. The cylindrical sleeve extends in the direction of the cylinder axis beyond the central portion and ends below the head portion of the transfer channel. The shape of the transfer channels essentially results from the cast, inwardly open configuration of the cylinder body. No lost core or the like is required for the manufacture. Subsequently, the cylindrical sleeve can be pressed in, whereby the outer side of the sleeve covers the central portion of the transfer channel inwardly in the direction of the cylinder chamber. The outer side of the cylindrical sleeve forms a flow-conducting wall of the transfer channel. It has been shown that the cylindrical outer surface of the sleeve contributes to a good flow guidance of the fuel/air mixture from the transfer channel. The on-the-whole cylindrical configuration of the outer surface permits a pressing-in at any desired angle of rotation.

No special devices are necessary for the mutual alignment of sleeve and cylinder body. Errors in assembly are avoided.

The cylindrical sleeve is expediently embodied as a cylindrical tubular component having a planar upper edge in the form of a circular ring. The sleeve is easy to produce. Recesses for the production of a transfer window or the like can be eliminated. The resulting rotational symmetry permits an easy assembly.

As a result of the cylindrical sleeve and the head portion of the transfer channel, it is possible to form a transfer window that opens into the cylinder chamber, whereby in particular the upper edge of the cylindrical sleeve forms a lower edge of the transfer window that extends linearly in the circumferential direction. There results a transfer window that is formed in a geometrically straightforward manner and has a good flow guidance. The geometrically straightforward configuration achieves the rotational symmetry, and hence the ability to mount the sleeve in a freely selectable direction of rotation. The appropriate configuration of the head portion of the transfer channel can have a simple shape, whereby casting molds without undercuts can be utilized.

The cylindrical sleeve is advantageously manufactured from aluminum, and in particular from a machined, extruded profiled aluminum section. In comparison to the cast material of the cylinder body, a highly elastic and possibly also a plastically deformable component results. Pursuant to a preferred securement of the sleeve by being pressed into the cylinder body, high pressing forces can be applied without damaging the material. There results a reliable press fit that is also able to withstand high thermal and mechanical stresses.

The manufacturing process for such a cylinder advantageously includes the following method steps. To begin with, the cast cylinder body is provided in the upper region, in other words in the region that extends from the transfer windows to the combustion chamber or to the cylinder head, with a cylinder surface on the inner side. The cylinder surface can be cast and possibly bored. The cylindrical sleeve is initially pressed into the cast cylinder body, whereby the upper edge of the sleeve abuts against a lower annular shoulder of the cylinder surface. Formed at the annular shoulder is an essentially gap-free butt joint that extends in the circumferential direction. Subsequently, the cylinder surface of the cylinder body, and the inner surface of the sleeve, are brought to a common measurement, for example by turning and/or a grinding process. After that, the cylinder surface and the inner surface are both provided with a continuous coating that spans the butt joint. The possibly subsequently machined coating forms the bore for a piston that is slidingly guided in the cylinder.

The butt joint is disposed in the lower region of the transfer window, and in this connection is provided with a relatively great axial spacing relative to the combustion chamber. The thermal stressing is correspondingly low. In conjunction with the reliable press fit described above, there results a low mechanical stressing. The spanning or bridging coating does not have a tendency to crack. On the whole, it is possible at a low manufacturing expenditure to produce a reliably loadable cylinder.

Further required windows, for example an inlet window, are advantageously formed only after the sleeve has been pressed in. The sleeve, which in the unfinished state is rotationally symmetrical, can be pressed in at any desired angular position. The subsequent forming of the inlet window produces a precise orientation relative, for example, to the inlet channel in the cylinder body. A simple machinability with low manufacturing expense results, in particular, if the inlet window is formed in the sleeve from the outside through the inlet channel.

To finish the cylinder, it is merely necessary to have access from the underside, in other words from the longitudinal side that faces away from the combustion chamber. Machining access may also possibly be required through the inlet channel. In this connection, the cylinder body is expediently monolithically formed with a cylinder head that adjoins the body in the axial direction. In addition to a reduced manufacturing expenditure, in particular leaks are avoided due to the failure of an assembly seam that has to be sealed off.

Further specific features of the present application will be described in detail subsequently.

DESCRIPTION OF SPECIFIC EMBODIMENTS

Referring now to the drawings in detail, the longitudinal cross-sectional illustration of FIG. 1 shows a cylinder 1 of an internal combustion engine for a manually guided implement. The cylinder 1 includes a cast cylinder body 3 and a similarly cast cylinder head 17. A cylinder chamber 2 is peripherally surrounded or delineated by the cylinder body 3. The cylinder chamber 2 includes an approximately spherically domed combustion chamber 28, which prescribes an upward direction 22 of the cylinder 1. The cylinder head 17 adjoins the cylinder body 3 in the upper direction 22, and is monolithically formed with the cylinder body. The cylinder head 17 can also be screwed or bolted to the cylinder body 3 accompanied by the interposition of a cylinder head seal.

In the illustrated embodiment, the cylinder 1 is provided, relative to the cylinder axis 5, with two approximately diametrically oppositely disposed transfer channels 4, each of which includes a central portion 6, which extends approximately parallel to the cylinder axis 5, and a portion 7 that is disposed above the central portion 6 and faces in the direction of the cylinder chamber 2. It can also be expedient to provide only a single transfer channel 4, or a greater number of transfer channels.

Pressed into the lower portion of the cylinder body 3, relative to the upper direction 22, is a cylindrical sleeve 8 (see also FIG. 3) that in the direction of the cylinder axis 5 extends beyond the central portion 6 and ends below the head portion 7 of the transfer channels 4. A cylinder surface 13 of the cylinder body 3, and an inner surface 15 of the sleeve 8, are machined to a comparable extent, whereby the resulting uniform cylindrical surface is interrupted by a butt joint 18 that extends around transverse to the cylinder axis 5. The cylinder surface 13 and the inner surface 15 are both provided with an indicated coating 16, whereby the coating 16 extends continually over both surfaces and in so doing spans the butt joint 18.

The two transfer channels 4 open out into the cylinder chamber 2 via transfer windows 11. The coating 16 is interrupted at the transfer windows 11. Provided above the butt joint 18, between the transfer windows 11, is an outlet window 21 for the discharge of exhaust gas.

Figure 2:
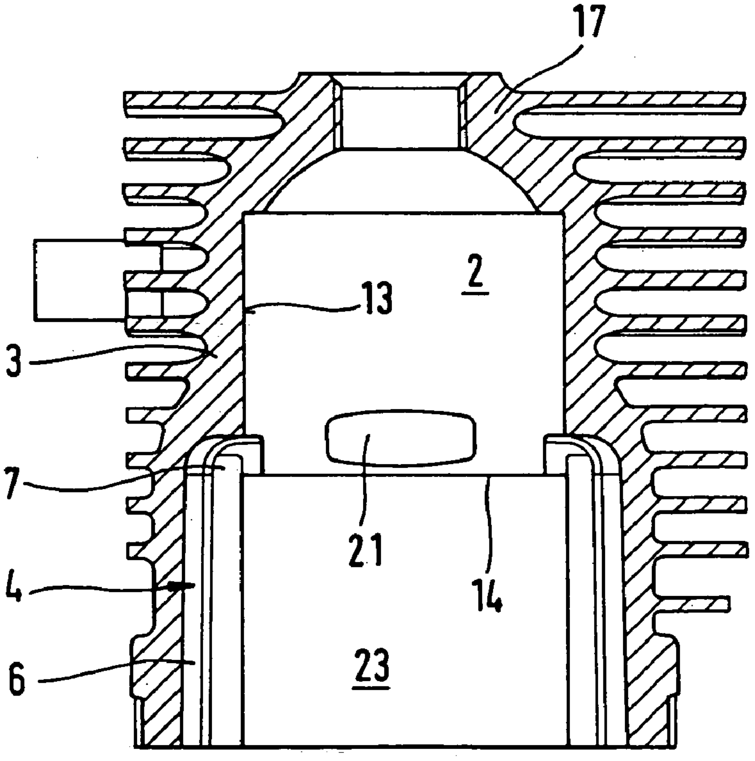
FIG. 2 is a longitudinal cross-sectional illustration of the cast cylinder body of FIG. 1.

FIG. 2 shows the cylinder body 3 of FIG. 1 as an individual component. The transfer channels 4 are cast in the cylinder body 3 in such a way that not only the head portion 7 but also the central portion 6 are open inwardly in the direction of the cylinder portion 2.

A cast-in cylinder surface 13 adjoins below the cylinder head 17 and merges below the head portion 7 into a further cylinder surface 23 having a larger diameter. Formed between the two cylinder surfaces 13 and 23 is a circumferential annular shoulder 14. The outlet window 21 is already formed into the upper cylinder surface 13. In the illustrated manufacturing stage, the pre-cast cylinder surfaces 13, 23 can already be machined.

Figure 3:
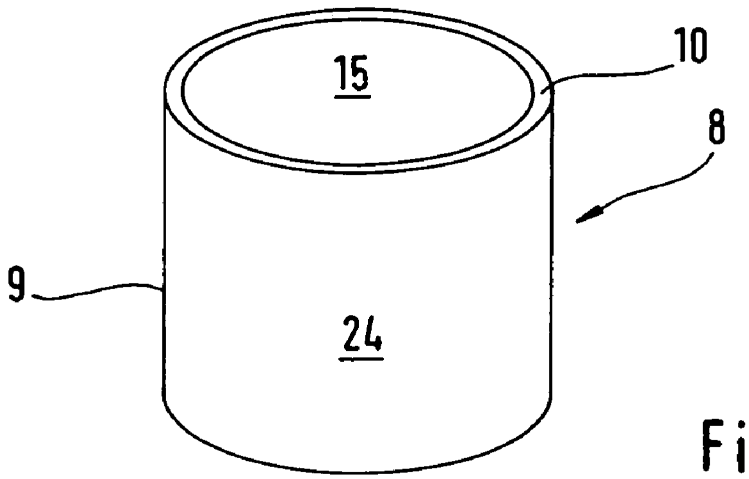
FIG. 3 is a perspective illustration of a cylindrical sleeve that is to be pressed into the cylinder body of FIG. 2.

The perspective illustration of FIG. 3 shows the cylindrical sleeve 8 of FIG. 1, which in the illustrated embodiment is in the form of a tubular component 9 having a cylindrical inner surface 15 and a cylindrical outer surface 24. An upper edge 10 of the tubular component 9 is in the form of a planar circular ring that is disposed perpendicular to the cylinder axis 5 (FIG. 1). The sleeve 8 can, for example, be produced from a steel, bronze, magnesium, or aluminum tube, and in the illustrated embodiment is advantageously produced from a machined, tubular, extruded profiled aluminum section.

Figure 4:
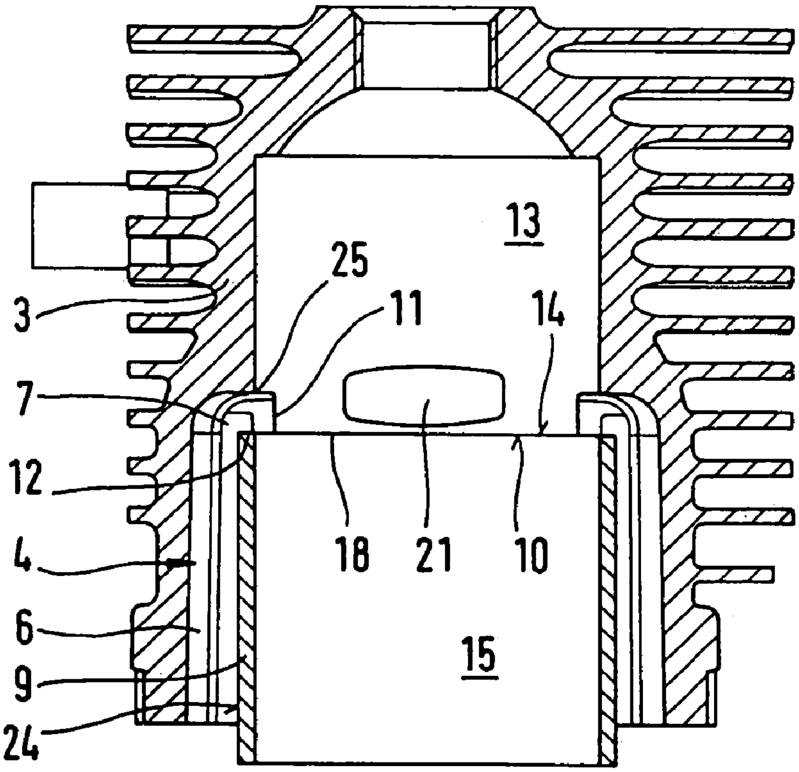

FIG. 4 shows the cylinder body 3 of FIG. 2 into which the sleeve 8 of FIG. 3 has been pressed in a first manufacturing step. In this connection, the surface 24 of the sleeve 8 is held in the cylinder surface 23 (FIG. 2) of the cylinder body 3 in a wedged manner. The sleeve 8 is pressed in an axial direction to such an extent that its upper edge 10 rests flushly against the annular shoulder 14 accompanied by the formation of a butt joint 18. In this connection, the cylindrical surface 24 delimits the central portion 6 of the transfer channels 4 in an inward direction. The transfer windows 11 are delimited upwardly by an upper edge 25 formed in the cylinder body 3, and downwardly by the planar, annular upper edge 10 of the cylindrical tubular component 9, which upper edge 10 extends linearly in the circumferential direction.

The outlet window 21 is entirely delimited by a peripheral edge in the cylinder surface 13. The butt joint 18 is axially spaced from the outlet window 21. In the illustrated assembly condition, the cylinder surface 13 and the inner surface 15 are machined to the same diameter. The coating 16 of FIG. 1 is subsequently applied, whereby the coating 16 can also be machined on the inner side, for example by honing or the like. The perspective external view of FIG. 5 shows the cylinder body 3 of FIGS. 1 to 4, with a carburetor flange 29 being integrally or monolithically formed on the cylinder body 3. Extending through the carburetor flange 29 is an inlet channel 20 that opens into the cylinder chamber 2 (FIG. 1) via an inlet window 19. Furthermore, a scavenging channel 26 is provided that opens into the cylinder chamber 2 via two scavenging windows 27.

FIG. 6 shows the arrangement of FIG. 1 in a view rotated by 180° about the cylinder axis 5. From this view, it can be seen that the inlet window 19 and the two scavenging windows 27 are disposed in the region of the sleeve 8. The inlet window 19 and the scavenging window 27 are produced only after the sleeve 8 is pressed into the cylinder body 3, with the appropriate opening being produced in the sleeve 8 via a suitable tool that is guided through the inlet channel 20 or the scavenging channel 26 (FIG. 5) respectively.

The specification incorporates by reference the disclosure of German priority document DE 103 61 293.9 filed Dec. 24, 2003.

The present invention is, of course, in no way restricted to the specific disclosure of the specification and drawings, but also encompasses any modifications within the scope of the appended claims.

What we claim is:

1. A cylinder for an internal combustion engine of a manually guided implement, comprising:

a cast cylinder body that peripherally delineates a cylinder chamber, wherein formed in said cylinder body is at least one transfer channel that is opened inwardly into said cylinder chamber and includes a central portion, which extends approximately parallel to an axis of said cylinder, and a head portion that above said central portion faces in the direction of said cylinder chamber; and a cylindrical sleeve that covers said central portion of said transfer channel inwardly in a direction of said cylinder chamber, wherein said cylindrical sleeve extends in a direction of said cylinder axis beyond said central portion and ends below said head portion of said transfer channel.

2. A cylinder according to claim 1, wherein said cylindrical sleeve is adapted to be pressed into said cylinder body.

3. A cylinder according to claim 1, wherein a cylinder head is provided that adjoins said cylinder body in an axial direction, and wherein said cylinder body and said cylinder head are monolithically formed.

4. A cylinder according to claim 1, wherein said cylindrical sleeve is made of aluminum.

5. A cylinder according to claim 4, wherein said cylindrical sleeve is made of a machined, extruded profiled aluminum section.

6. A cylinder according to claim 1, wherein said cylindrical sleeve is in the form of a cylindrical tubular component having a planar upper edge in the form of a circular ring.

7. A cylinder according to claim 6, wherein a transfer window that opens into said cylinder chamber is formed by said cylindrical sleeve and said head portion of said transfer channel, and wherein said upper edge of said cylindrical sleeve forms a lower edge of said transfer window 11 that extends linearly in a circumferential direction.

8. A cylinder according to claim 6, wherein on an inner side, said cylinder body is machined above said cylindrical sleeve as a cylinder surface having an annular shoulder, wherein said upper edge of said cylindrical sleeve adjoins said annular shoulder in a flush manner accompanied by the formation of a butt joint, and wherein a continuous coating is provided that covers both said cylinder surface and an inner surface of said sleeve and also spans said butt joint.

9. A method of producing the cylinder of claim 7, including the steps of:

pressing said cylindrical sleeve into said cast cylinder body;

machining the inner cylindrical surface of said cylinder body and the inner surface of said cylindrical sleeve to a common extent;

providing both said inner cylinder surface and said inner surface with the continuous coating that spans said butt joint.

10. A method according to claim 9, wherein after said step of pressing said cylindrical sleeve into said cast cylinder body, a further window is formed in said cylindrical sleeve.

11. A method according to claim 10, wherein said further window is an inlet window.

12. A method according to claim 11, wherein said cylinder body is provided with an inlet channel in a region of said inlet window, and wherein said inlet window is formed in said sleeve from the outside through said inlet channel.

* * * * *